United States Patent
Hesketh (10) Patent No.: US 7,798,313 B2
(45) Date of Patent: Sep. 21, 2010

(54) DYNAMIC TENSION CONTROL APPARATUS AND METHOD FOR AERO-MECHANICAL CONVEYOR

(75) Inventor: David Francis Hesketh, Fort Mill, SC (US)

(73) Assignee: Spiroflow Systems, Inc., Monroe, NC (US)

( * ) Notice: Subject to any disclaimer, the term of this patent is extended or adjusted under 35 U.S.C. 154(b) by 291 days.

(21) Appl. No.: 11/942,892

(22) Filed: Nov. 20, 2007

(65) Prior Publication Data
US 2008/0289935 A1 Nov. 27, 2008

Related U.S. Application Data

(60) Provisional application No. 60/866,980, filed on Nov. 22, 2006.

(51) Int. Cl.
B65G 23/44 (2006.01)
(52) U.S. Cl. ..................................................... 198/814
(58) Field of Classification Search ................. 198/813, 198/814
See application file for complete search history.

(56) References Cited

U.S. PATENT DOCUMENTS

| | | | |
|---|---|---|---|
| 3,905,473 A * | 9/1975 | Jones et al. ................. | 198/718 |
| 3,924,729 A | 12/1975 | Flinth et al. | |
| 4,071,136 A * | 1/1978 | Jones ......................... | 198/718 |
| 4,195,725 A * | 4/1980 | Jones ......................... | 198/718 |
| 4,653,634 A | 3/1987 | Hansen | |
| 4,660,267 A | 4/1987 | Wheeler | |
| 5,660,267 A * | 8/1997 | Buhman ................. | 198/810.04 |
| 6,415,908 B1 * | 7/2002 | Ambs et al. ................. | 198/716 |
| 6,516,941 B1 * | 2/2003 | Buhne ......................... | 198/813 |
| 6,598,736 B2 | 7/2003 | Ellis et al. | |
| 7,520,378 B2 * | 4/2009 | Hansen et al. ............... | 198/807 |

* cited by examiner

Primary Examiner—Joe Dillon, Jr.
(74) Attorney, Agent, or Firm—Adams Intellectual Property Law (57) ABSTRACT

A tensioning assembly for use in an aero-mechanical conveyor for moving bulk materials. The conveyor includes upper and lower housings having head and tail pulley assemblies mounted therein. The tensioning assembly includes first and second extendable tubes that define sections of inflow and outflow conveyor tubes that interconnect the upper and lower housings. An endless rope assembly is disposed within the conveyor tubes and around the head and tail pulleys. An adjustable actuator is positioned in cooperative engagement with the first and second extendable tubes. When the actuator is in a first position, the extendable tubes have a first length and when the actuator is in a second position, the extendable tubes have a second length. The actuator is configured to move between the first position and the second position in response to changes in tension within the endless rope assembly as indicated by a signal from a tension measuring device.

7 Claims, 9 Drawing Sheets

DYNAMIC TENSION CONTROL APPARATUS AND METHOD FOR AERO-MECHANICAL CONVEYOR

CROSS REFERENCE TO RELATED APPLICATIONS

This application claims the benefit of Provisional Application No. 60/866,980, filed on Nov. 22, 2006.

TECHNICAL FIELD AND BACKGROUND OF THE INVENTION

This invention relates to a dynamic tension control apparatus and tensioning method for an aero-mechanical conveyor. Aero-mechanical conveyors are often used to convey powders and other particulate matter by entraining the particulate matter in a moving airstream. Such conveyors typically include an endless wire rope assembly upon which dividers are fastened and used for carrying the particulate matter. The rope assembly is typically carried on drive and driven pulleys enclosed within infeed, corner, and discharge housings in various configurations. The housings are interconnected by two tubes through which the rope assembly travels as it moves around the drive and driven pulleys. As the conveyor operates, forces are exerted on the rope assembly that can cause the rope assembly to stretch. Such forces are created by normal wear on the conveyor, the weight of the material being conveyed along the rope assembly, and similar other factors. The rope assembly can stretch to the point that a conventional tensioning device cannot exert adequate tension on the rope.

While prior art manual tension adjusting mechanisms exist for moving the head and tail pulley assemblies relative to each other to maintain the correct amount of tension on the rope assembly, such mechanisms are often inadequate. For example, some traditional prior art tension adjusting mechanisms rely on clamps which fasten the semi-circular housings to the tubes. Tension on the rope assembly is adjusted by loosening the bolts that hold the clamps in place and sliding one or both of the housings inwardly or outwardly relative to the tubes. Another prior art method of adjusting the tension on the rope assembly involves moving the drive or driven pulley together with the housing. Regardless of which prior art method is employed, adjusting the tension by moving the housings relative to the conveyor tubes is a manual operation. In addition, the discharge end of the equipment is frequently inaccessible, making access to the tube-joining clamps challenging, and according to each method, the clamps have to be slackened and re-tightened. Furthermore, once the tension has been adjusted, there is no guarantee that the tubes and the connecting spigots leading to the housings will be properly aligned, which makes jamming a possible cause of failure.

The invention of the present application overcomes the problems inherent to the prior art described above by providing a tension control apparatus for use on an aero-mechanical conveyor that adjusts tension by moving the housings and pulley assemblies automatically and without requiring any significant manual intervention. The tension control apparatus of the present invention uses a constant load device such as a pneumatic cylinder that applies a pre-selected amount of tension on the rope assembly. In addition, the present invention can include a visual or electronic indication of when the tension control apparatus must be reset due to excessive rope stretch.

SUMMARY OF THE INVENTION

The invention of the present application provides a dynamic tensioning apparatus. The present invention also provides tensioning apparatus that can quickly respond to changes in load on an aero-mechanical conveyor that may be caused by foreign objects such as bolts. The present invention also provides a pneumatic tensioning apparatus that is directly incorporated into a sliding seal assembly.

Therefore, it is an object of the present invention to provide an aero-mechanical conveyor having components which facilitate easy handling and installation, and provide low maintenance operation.

It is another object of the present invention to provide an aero-mechanical conveyor that includes a tension control apparatus that dynamically maintains the tensioning force applied to the rope assembly on the conveyor.

It is another object of the present invention to provide an aero-mechanical conveyor having a simple device for applying a generally constant tension on the rope assembly.

It is another object of the present invention to provide an aero-mechanical conveyor having a dynamic tensioning assembly that includes a sliding seal assembly that is continuously purged with air while the aero-mechanical conveyor is operating.

It is another object of the present invention to provide an aero-mechanical conveyor having a dynamic tensioning assembly that includes a tensioning actuator that is directly incorporated into a sliding seal assembly.

It is another object of the invention to provide an aero-mechanical conveyor that includes a tension control apparatus capable of generally continuous use.

It is another object of the present invention to provide an aero-mechanical conveyor that includes a tension control apparatus which can be used in vertical, angled or horizontal aero-mechanical conveyor systems.

Therefore, in one embodiment there is provided a tensioning assembly for use in an aero-mechanical conveyor for moving bulk materials. The conveyor includes upper and lower housings, head and tail pulley assemblies mounted on respective shafts positioned within the upper and lower housings, spaced-apart inflow and outflow conveyor tubes interconnecting the upper and lower housings, and an endless rope assembly disposed within the conveyor tubes and around the head and tail pulleys. The tensioning assembly includes a first and second extendable tube that are each configured to define a section of the inflow and outflow conveyor tubes respectively. An adjustable actuator that is movable between a first position and a second position and is positioned in cooperative engagement with the first and second extendable tubes. When the actuator is in the first position, the first and second extendable tubes have a first length and when the actuator is in the second position, the first and second extendable tubes have a second length. A tension measuring device configured for measuring tension within the endless rope assembly and for generating a signal indicative thereof is provided and the actuator is configured to move between the first position and the second position in response to changes in the signal indicative of tension within the endless rope assembly.

According to another embodiment, there is provided tensioning assembly, wherein the actuator is a pneumatic cylinder.

According to yet another embodiment there is provided tensioning assembly, wherein the actuator is a hydraulic cylinder.

According to another embodiment, there is provided tensioning assembly, wherein the tension measuring device is a pressure regulator.

According to another embodiment, there is provided tensioning assembly, wherein the actuator is an electro-mechanical device.

According to another embodiment, there is provided tensioning assembly, wherein the tension measuring device is a load cell.

According to another embodiment, there is provided tensioning assembly, that also includes a first flange and a second flange wherein the first and second extendable tubes are positioned between the first and second flanges such that the extendable tubes are spaced apart and generally parallel and the actuator is positioned such that movement of the actuator causes movement of at least one of the first and second flanges.

In one embodiment, there is provided a tensioning assembly for use in an aero-mechanical conveyor for moving bulk materials. The conveyor includes upper and lower housings, head and tail pulley assemblies mounted on respective shafts positioned within the upper and lower housings, spaced-apart inflow and outflow conveyor tubes interconnecting the upper and lower housings, and an endless rope assembly disposed within the conveyor tubes and around the head and tail pulleys. The tensioning assembly includes a first extendable tube and a second extendable tube that are each configured to define a section of the inflow and outflow conveyor tubes respectively. There is also provided a means for moving the first and second extendable tubes between a first and second. When the first and second extendable tubes are in the first position, the first and second extendable tubes have a first length and when the first and second extendable tubes are in the second position, the first and second extendable tubes have a second length. A tension measuring device configured for measuring tension within the endless rope assembly and for generating a signal indicative thereof. The means for moving is configured to move in response to changes in the signal indicative of tension within the endless rope assembly. There is also provided an aero-mechanical conveyor for moving bulk materials that includes upper and lower housings, head and tail pulley assemblies mounted on respective shafts positioned within the upper and lower housings, spaced-apart inflow and outflow conveyor tubes interconnecting the upper and lower housings, and an endless rope assembly disposed within the conveyor tubes and around the head and tail pulleys. The conveyor also includes a tensioning assembly that includes a first and second extendable tube that are each configured to define a section of the inflow and outflow conveyor tubes respectively. An adjustable actuator that is movable between a first position and a second position and is positioned in cooperative engagement with the first and second extendable tubes. When the actuator is in the first position, the first and second extendable tubes have a first length and when the actuator is in the second position, the first and second extendable tubes have a second length. A tension measuring device configured for measuring tension within the endless rope assembly and for generating a signal indicative thereof is provided and the actuator is configured to move between the first position and the second position in response to changes in the signal indicative of tension within the endless rope assembly.

In yet another embodiment, there is provided a method for controlling the tension within an aero-mechanical conveyor for moving bulk materials. An aero-mechanical conveyor is provided. The aero-mechanical conveyor includes upper and lower housings, head and tail pulley assemblies mounted on respective shafts positioned within the upper and lower housings, spaced-apart inflow and outflow conveyor tubes interconnecting the upper and lower housings, and an endless rope assembly disposed within the conveyor tubes and around the head and tail pulleys, and a tensioning assembly comprising: a first extendable tube and a second extendable tube each configured to define a section of the inflow and outflow conveyor tubes respectively; an adjustable actuator that is movable between a first position and a second position and positioned in cooperative engagement with the first and second extendable tubes such that when the actuator is in the first position, the first and second extendable tubes have a first length and when the actuator is in the second position, the first and second extendable tubes have a second length; a tension measuring device configured for measuring tension within the endless rope assembly and for generating a signal indicative thereof; and the actuator being configured to move between the first position and the second position in response to changes in the signal indicative of tension within the endless rope assembly. The conveyor is operated such that the endless rope assembly moves through the conveyor tubes. The signal indicative of tension within the endless rope assembly is monitored. The tension within the endless rope assembly is changed by moving the actuator such that the tension approaches a predetermined value.

These and other objects of the present invention are achieved in the preferred embodiments disclosed below.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Referring now specifically to the drawings, an aero-mechanical conveyor according to the present invention is illustrated in FIG. 1 and shown generally at reference numeral 10. The conveyor 10 includes an upper housing 12 and an infeed housing 14 that are interconnected by inflow and outflow conveyor tubes 16 and 18. A head pulley assembly 32 that includes a sprocket is mounted on an upper shaft 34 that is positioned in the upper housing 12. Upper shaft 34 extends through one side of the upper housing 12 perpendicularly to the plane upon which rope assembly 40 travels. The upper shaft 34 is carried by and extends through bearing housings (not shown). The upper housing 12 includes a top portion 20 that is removably attached to a bottom portion 22 along first and second angle flanges 24. The top portion 20 is removable for permitting access to the interior of the upper housing 12 for inspection and maintenance, and defines an outlet opening 28 through which particulate matter can exit the conveyor 10. The upper housing 12 may optionally include a discharge chute.

The infeed housing 14 of conveyor 10 includes an inlet hopper 30 for storing particulate matter "P." A tail pulley assembly 36 is mounted on a lower shaft 38 that is positioned in the infeed housing 14. A continuous rope assembly 40 upon which multiple identical disks 42 are carried is disposed around the head and tail pulley assemblies 32 and 36, and extends through the respective inflow and outflow conveyor tubes 16 and 18. Inflow conveyor tube 16 includes an inlet tube 48 having a lower end 50 which is connected to infeed housing 14. The inlet tube 48 also includes an upper end 52. Tubular portion 54 is connected to the upper housing 12 at the bottom portion 22 at an upper end 56. Outflow conveyor tube 18 similarly includes an outlet tube 62 having a lower end 64 connected to infeed housing 14 and an upper end 66. A second upper tubular portion 68 of outflow conveyor tube 18 has an upper end 70 connected to the housing 12 and a lower end 69.

A drive mechanism 44 is positioned adjacent the infeed housing 14 and is operatively connected to the lower shaft 38. The drive mechanism 44 drives the lower shaft 38, causing the head pulley assembly 32 to rotate. This in turn drives the tail pulley assembly 36, and causes the rope assembly 40 to travel in the direction "D" shown. As the rope assembly travels, the disks 42 carry particulate matter from the inlet hopper 30 through the inflow conveyor tube 16, and into the upper housing 12, where the particulate matter exits the conveyor 10 through the outlet opening 28. Although the drive mechanism 44 is shown in FIG. 1 operatively connected to the lower shaft 38, the drive mechanism 44 may alternatively be operatively connected to the upper shaft 34.

Continuing to refer to FIG. 1, the conveyor 10 also includes a tensioning assembly 200 which is configured to maintain a preselected amount of tension on the rope assembly 40. While the tensioning assembly 200 is shown in FIG. 1 in use on a vertical aero-mechanical conveyor, the tensioning assembly 200 may be used on an angled or horizontal conveyor, or on a conveyor having interconnected vertical and horizontal sections.

In one embodiment, tensioning assembly 200 includes flanges 202A, 202B that are attached to opposite ends of extendable tubes 220A, 220B and a pneumatic actuator 262 configured to extend and contract extendable tubes 220A, 220B by applying force to flanges 202A, 202B. Each flange 202A, 202B is an elongated bar having an opening formed through each end.

Referring to FIGS. 2 and 3, each extendable tube 220A, 220B includes an outer sleeve 222A, 222B, that are each attached at one end to a flange 202A. In this regard, the bore of the outer sleeve 222A, 222B is aligned with an opening formed through flange 202A. Tensioning assembly 200 also includes a pair of inner sleeves 242A, 242B that are attached at one end to a flange 202B and are slidably received within the outer sleeves 222A, 222B at the other end. Inner sleeves 242A, 242B are each a cylindrical tube that has a bore that together with the bore through the associated outer sleeve 222A, 222B forms a passageway for conveying particulate. A pair of seals 244A and 244B are positioned around each of the inner sleeves 242A, 242B for engaging outer sleeve 222A, 222B. An air purge passageway 245 is formed through outer sleeves 222A, 222B that connects a space defined between outer sleeve 222A, 222B; inner sleeve 242A, 242B; and the pair of seals 244A 244B to a source of compressed air. The compressed air is maintained at a pressure sufficient to purge the space and to prevent accumulation of dust and debris within the space. The sealing members can be o-rings formed of PTFE, EPDM, butyl rubber, or other suitable material. Each engaged set of outer sleeves 222A, 222B and inner sleeves 242A, 242B form an extendable tube 220A, 220B that each defines a section of inflow and outflow conveyor tubes 16 and 18 respectively. It should be appreciated that extendable tubes according the present invention can be formed directly from the inflow and outflow conveyor tubes 16 and 18 that are attached to the upper housing 12 and the infeed housing 14.

A pneumatic actuator 262 is positioned between the tubes 220A, 220B and is connected to flanges 202A, 202B at opposite ends. Movement of pneumatic actuator 262 causes movement of flange 202A relative to flange 202B and thus movement of the tubes 220A, 220B. The pneumatic actuator 262 is connected to a source of compressed air 263 that can be adjusted to a predetermined pressure via a pressure regulator 264. Tubes 220A, 220B can thus be extended and retracted by varying the air pressure applied to the pneumatic actuator 262, and tubes 220A, 220B can be held in a desired position by maintaining a constant air pressure with pressure regulator 264 when the tension on rope assembly 40 is constant. In this regard, the air pressure of pneumatic actuator 262 is a signal indicative of tension in rope assembly 40. In one embodiment shown in FIG. 5, a load cell 268 is disposed between the pneumatic actuator 262 and flange 202A. Load cell 263 is also configured to generate a signal indicative of the force applied by pneumatic actuator 262 and flange 202A. The load cell 268 is electrically connected to a controller 270 that is configured to control pneumatic actuator 262 to provide a dynamic variable tensioning force.

Tensioning assembly 200 is positioned between upper housing 12 and lower housing 14 of aero-mechanical conveyor 10. Referring again to FIG. 1, upper end 52 of the inlet tube 48 is connected to second flange 202B at an opening such that inlet tube 48 is axially aligned with the passageway that extends through extendable tube 200A. End 55 of first upper tubular portion 54 is connected to first flange 202A such that tubular portion 54 is connected with inlet tube 48 via the passageway of second extendable tube 220B. Similarly, upper end 66 of outlet tube 62 is connected to second flange 202B at an opening such that inlet tube 48 is axially aligned with the passageway of first extendable tube 220A. Lower end 69 of second upper tubular portion 68 is connected to first flange 202A such that tubular portion 68 is connected to outlet tube 62 via the passageway of first extendable tube 220A.

The tensioning assembly 200 in the illustrated embodiment is used to maintain a preselected amount of tension on the rope assembly 40 by maintaining a generally constant force between first flange 202A and second flange 202B. This generally constant force is transmitted through first upper tubular portion 54 and second upper tubular portion 68, upper housing 12, and the sprocket to rope assembly 40.

Tensioning assembly 200 effectively compensates for decreases in tension on the rope assembly 40 as the rope assembly 40 stretches. For example, when the total length of the rope assembly (which is doubled around pulley assembly 36) stretches 2 inches, the tensioning assembly 200 compensates for that stretch by extending 1 inch. Preferably the tensioning assembly 200 is configured to initially provide the desired tension at an extension of 0.5 inches and can extend a total of 5 inches.

Figure 1:
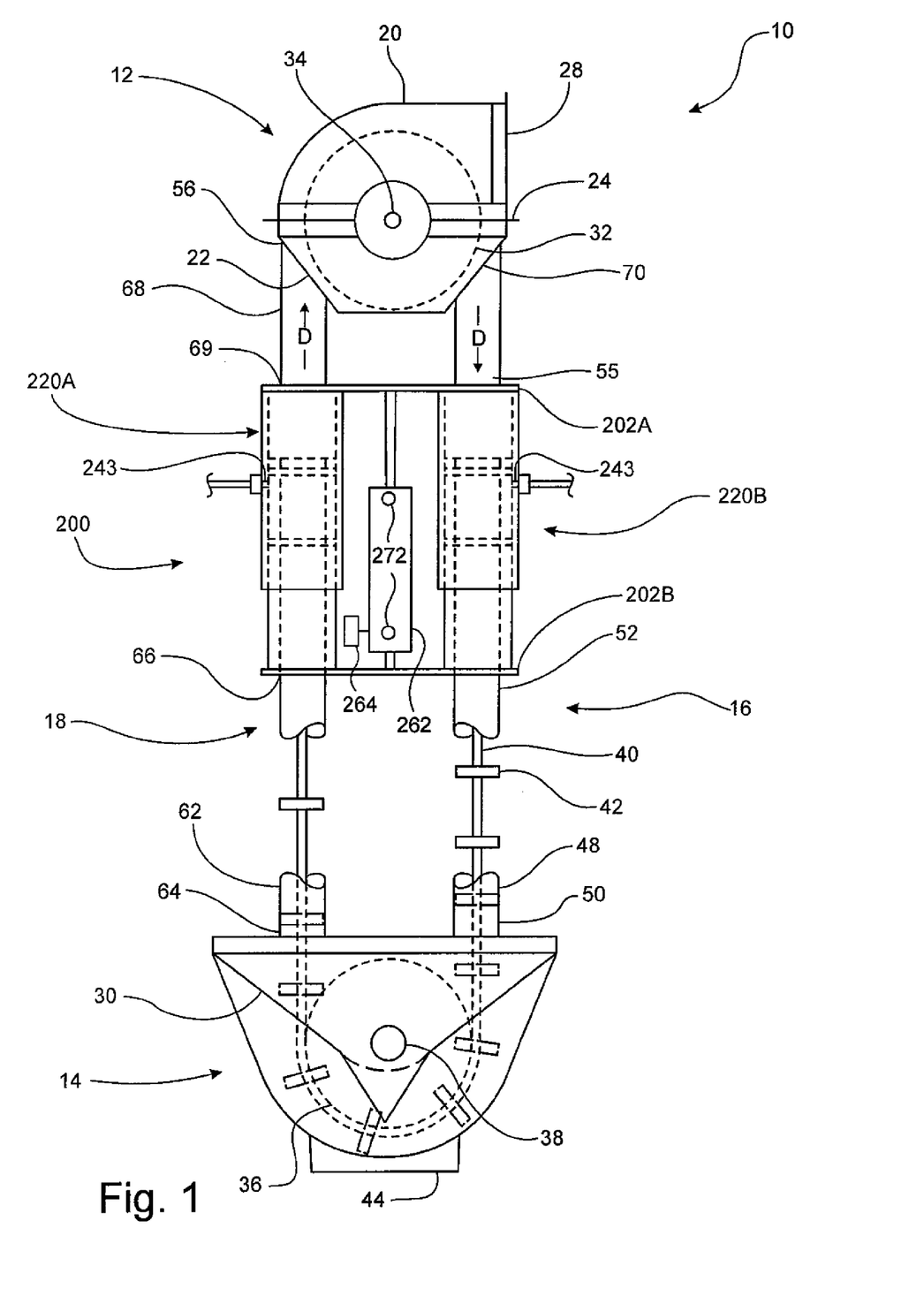
FIG. 1 is a cut-away side elevation of a tension control according to an embodiment of the present invention shown in use on an aero-mechanical conveyor.
Figure 2:
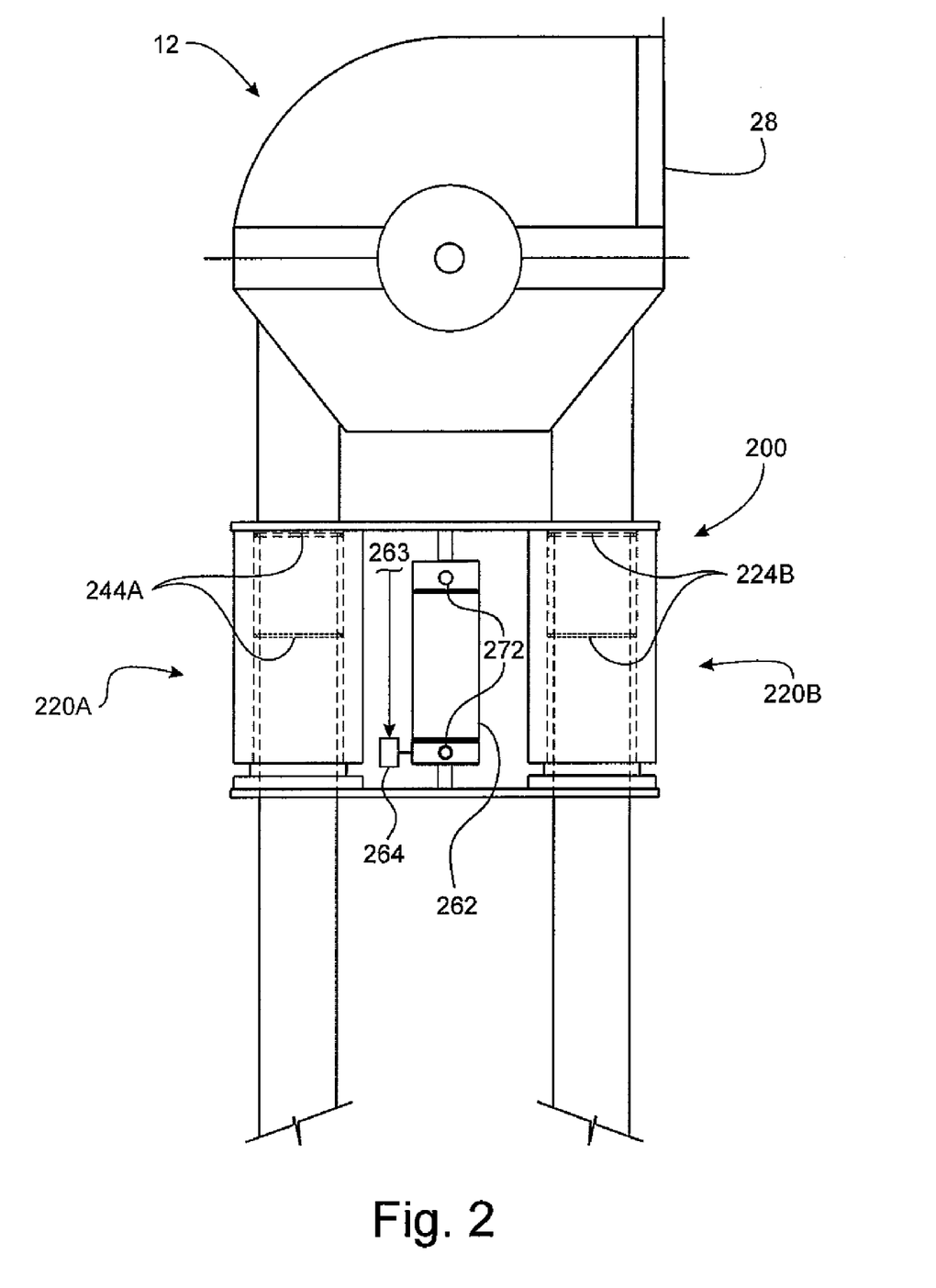
FIG. 2 shows a partial front view of the tension control apparatus shown in FIG. 1, wherein the tension control apparatus is in a first position.
Figure 3:
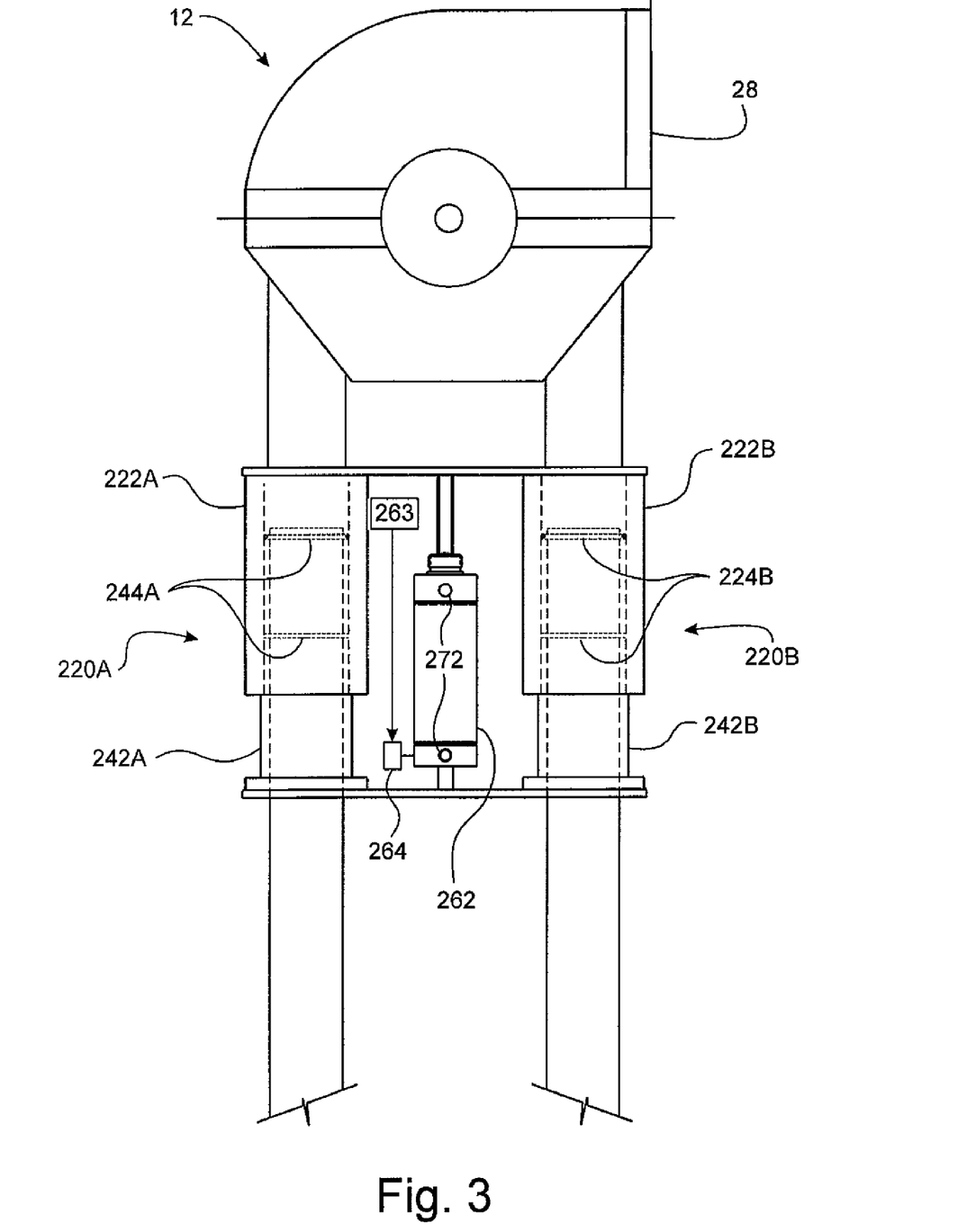
FIG. 3 shows the tension control apparatus shown in FIG. 2, wherein the tension control apparatus is in second position.

Unlike conventional "resilient" tensioning devices, the tensioning assembly 200 responds effectively to sudden changes in dynamic tension as the conveyor 10 operates. Specifically, during operation of a near-vertical conveyor such as the conveyor 10, the dynamic tension on the rope assembly 40 may be 50% higher than the static tension. The 262 responds to this difference by expanding or contracting accordingly to maintain the predetermined tension. For example, an instantaneous increase in load caused by an obstruction due to snagging or large particle size, can cause an abrupt increase in tension on the rope assembly 40. Such a sudden change can cause the rope assembly 40 to slacken behind the obstruction enough to get out of pitch and cause a complete jam within the conveyor 10. The tensioning assembly 200 acts to reduce the possibility of a complete jam by maintaining a constant force on rope assembly 40 through operation of the actuator 262. When the tension within rope assembly 40 increases, the force applied to the pneumatic actuator 262 by the rope assembly 40 increases. As a result, a pressure control valve adjusts to lower the air pressure applied to pneumatic actuator 262 to maintain the desired constant pressure, and as result, the desired constant tension on the rope assembly 40. In this example, such an adjustment causes the pneumatic actuator 262 to shorten until the tension on rope assembly 40 is at the predetermined level. The tensioning assembly 200 is shown in a first position in FIG. 1 and in a second, more extended position in FIG. 2. The inner sleeves can be marked to visually indicate the amount that the tensioning assembly 200 is extended.

In the illustrated embodiment, a pair of proximity sensors 272 are attached to the pneumatic actuator 262 and are configured to generate a signal indicative of the amount that tensioning assembly 200 is extended. The sensors 272 are reed switches that generate an electrical signal indicative of the position of the rod of the pneumatic actuator 262. The reed switches are connected to a visual display, audible device, or electronic controller 270 that is configured to further respond to the position of the tensioning assembly 200. Alternatively, proximity sensors could be attached to either of the tubes 202A, 202B.

Figure 4:
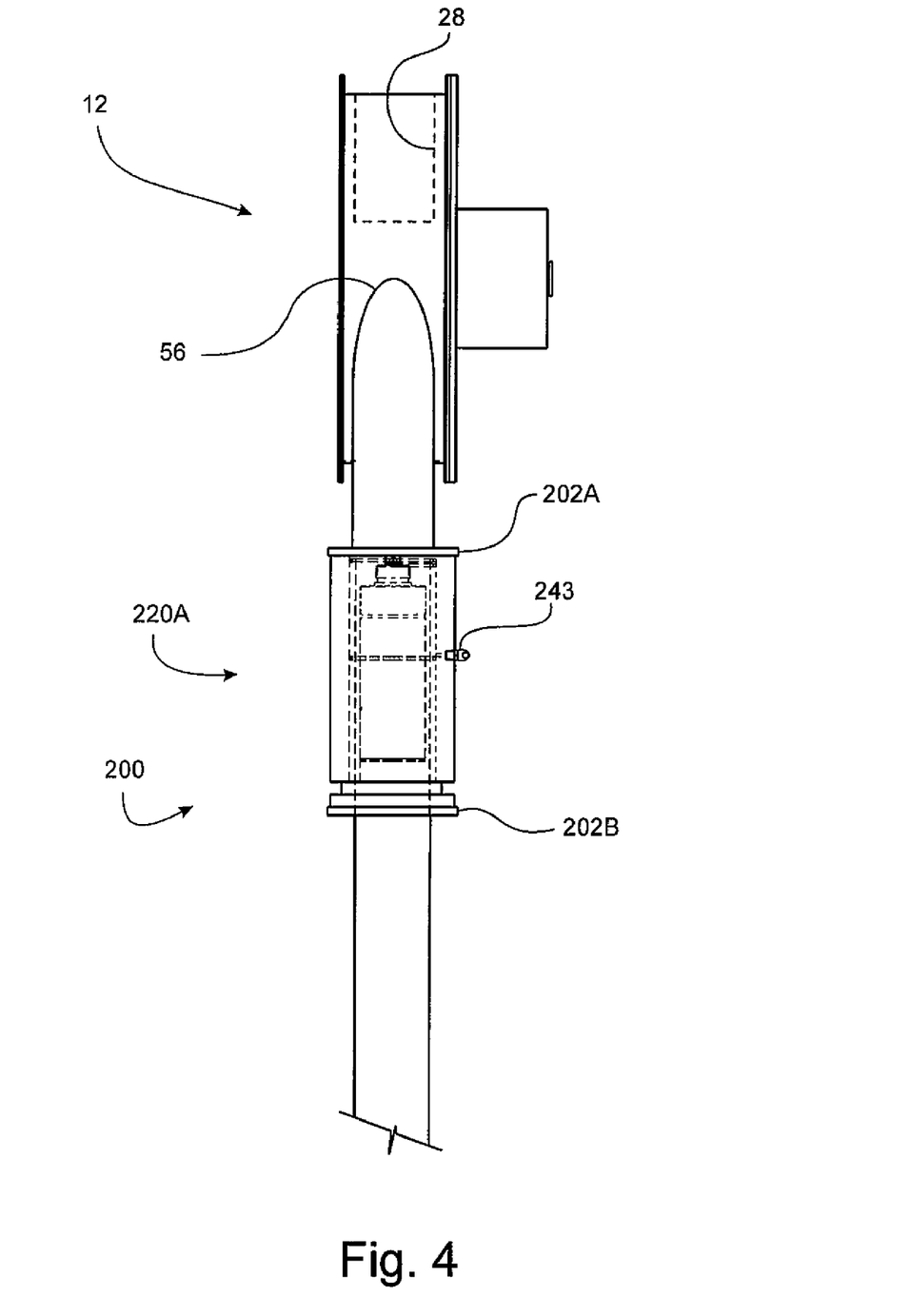
FIG. 4 shows a partial side view of the tension control apparatus shown in FIG. 3.
Figure 5:
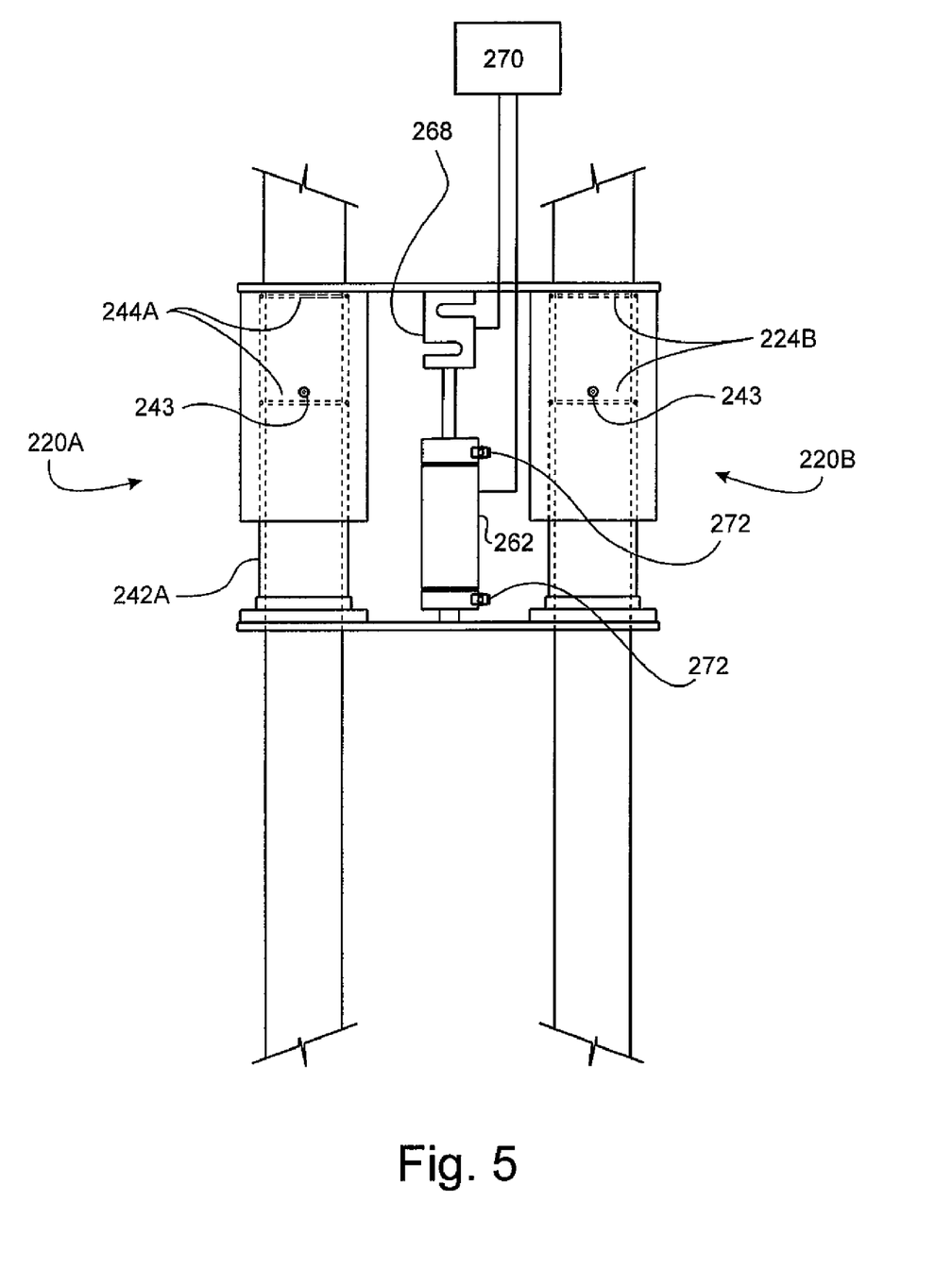
FIG. 5 shows a partial front view of a tension control apparatus according to an embodiment of the present invention having a pneumatic actuator and a load cell.
Figure 6:
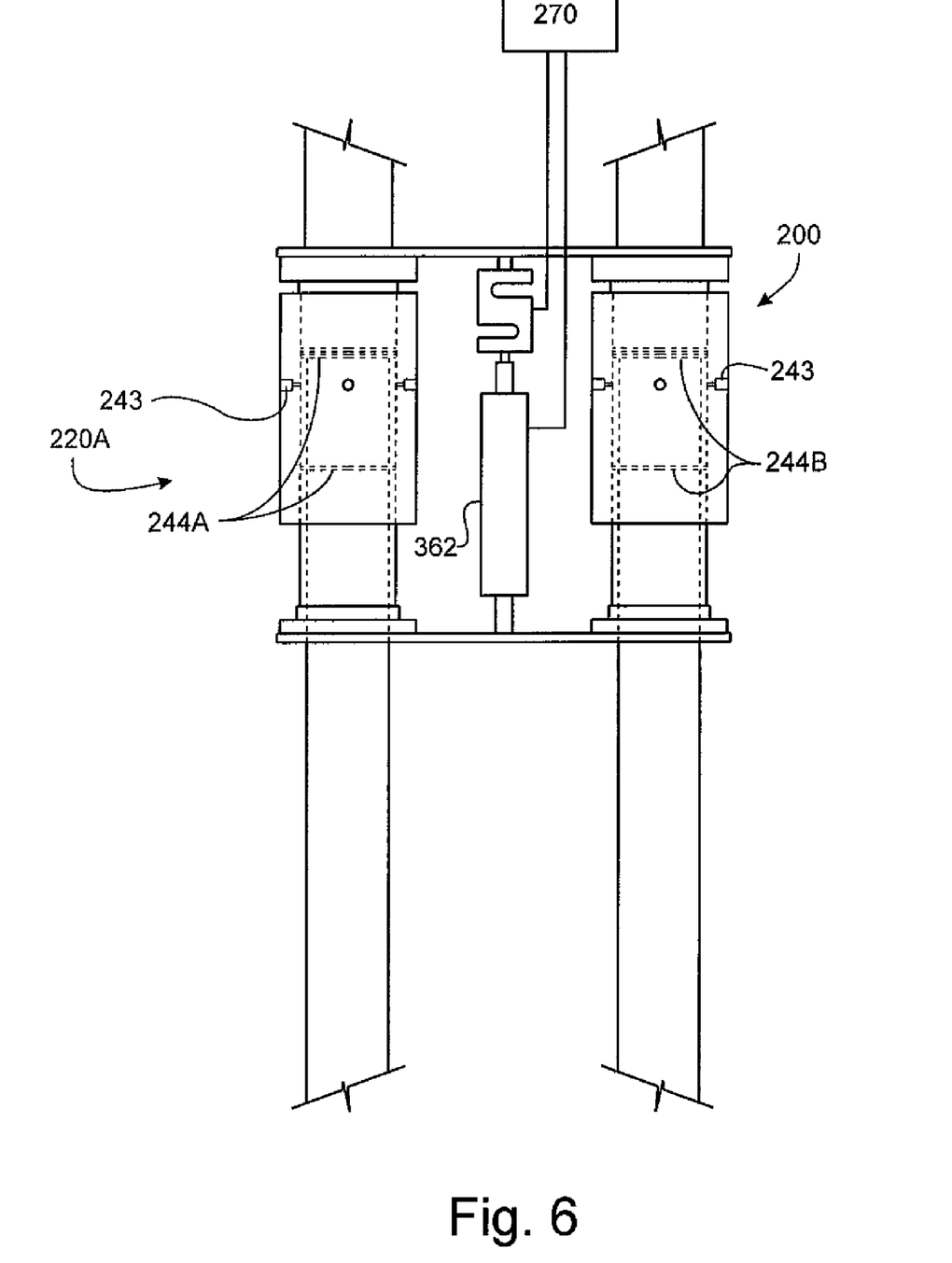
FIG. 6 shows a partial front view of a tension control apparatus according to an embodiment of the present invention having an electric motor actuator.

In another embodiment shown in FIGS. 4 and 5, the pneumatic actuator 262 can be replaced by a electrical actuator 362 having a shaft extending therefrom. In this embodiment, one end of the electrical actuator 362 is connected to second flange 202B and another end of the electrical actuator 362 is connected to a sensor for sensing force, e.g. a load cell, which is connected to first flange 202A. The load cell is electrically connected to the controller 270 and is configured to generate a signal indicative of force applied by the electrical actuator 362 to flanges 202A, 202B. The controller 270 is configured to cause the electrical actuator 362 to move such that a desired force is applied to flanges 202A, 202B.

Figure 7:
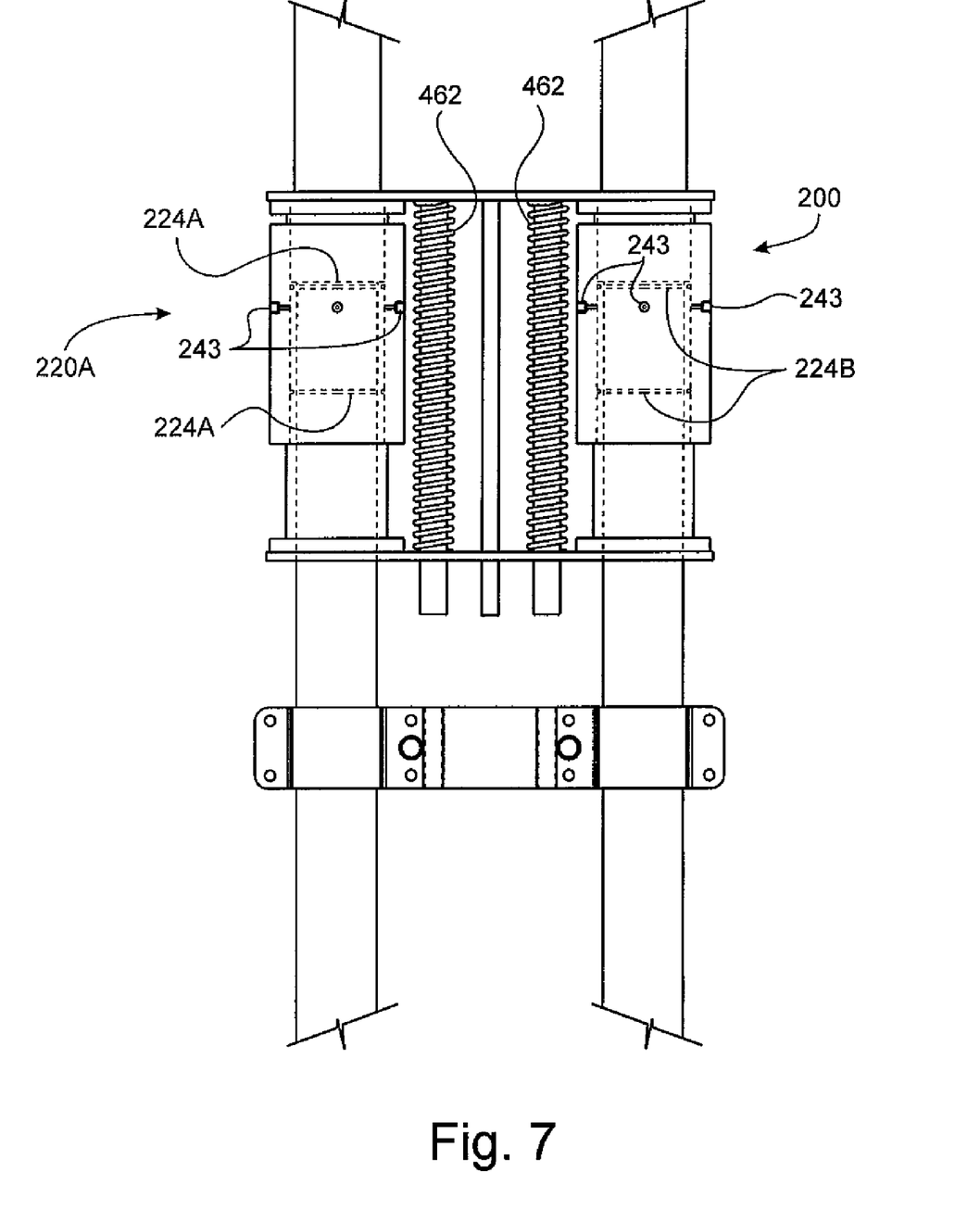
FIG. 7 shows a partial front view of a tension control apparatus according to an embodiment of the present invention having a spring actuator.

In another embodiment, the pneumatic actuator 262 can be replaced by springs 462 as shown in FIG. 7. The springs 462 are positioned such that they operate in compression and apply a force to flanges 202 to maintain tension on rope assembly 40.

Figure 8:
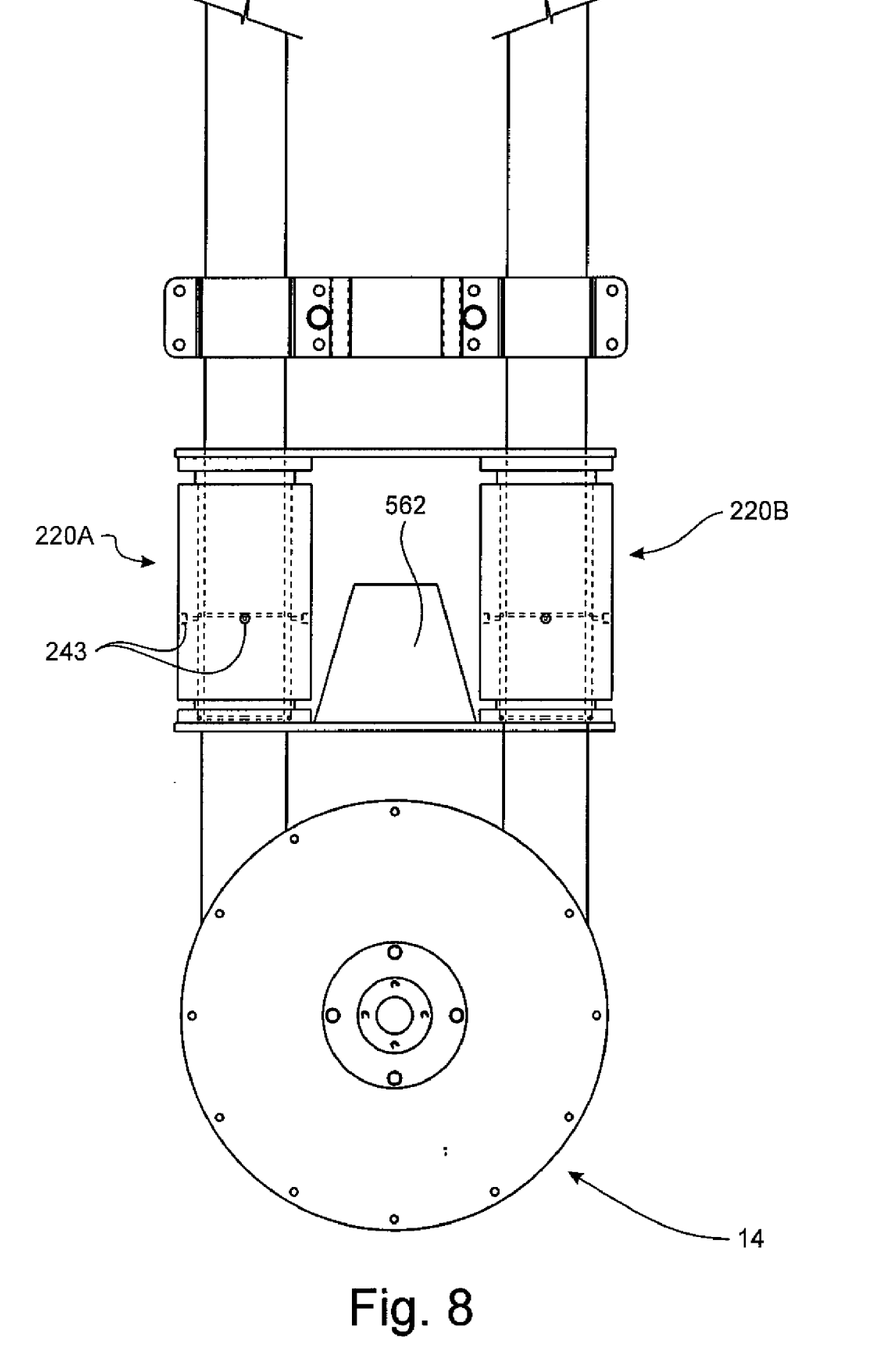
FIG. 8 shows a partial front view of a tension control apparatus according to an embodiment of the present invention that utilizes gravity and an applied load.

In another embodiment, shown in FIG. 8, the tensioning assembly 200 and the housing 12 are oriented such that the force of gravity maintains tension on rope assembly 40. An applied load 562 can be attached to housing 12 or the weight of the tensioning assembly 200 can be used to provide the desired force.

Figure 9:
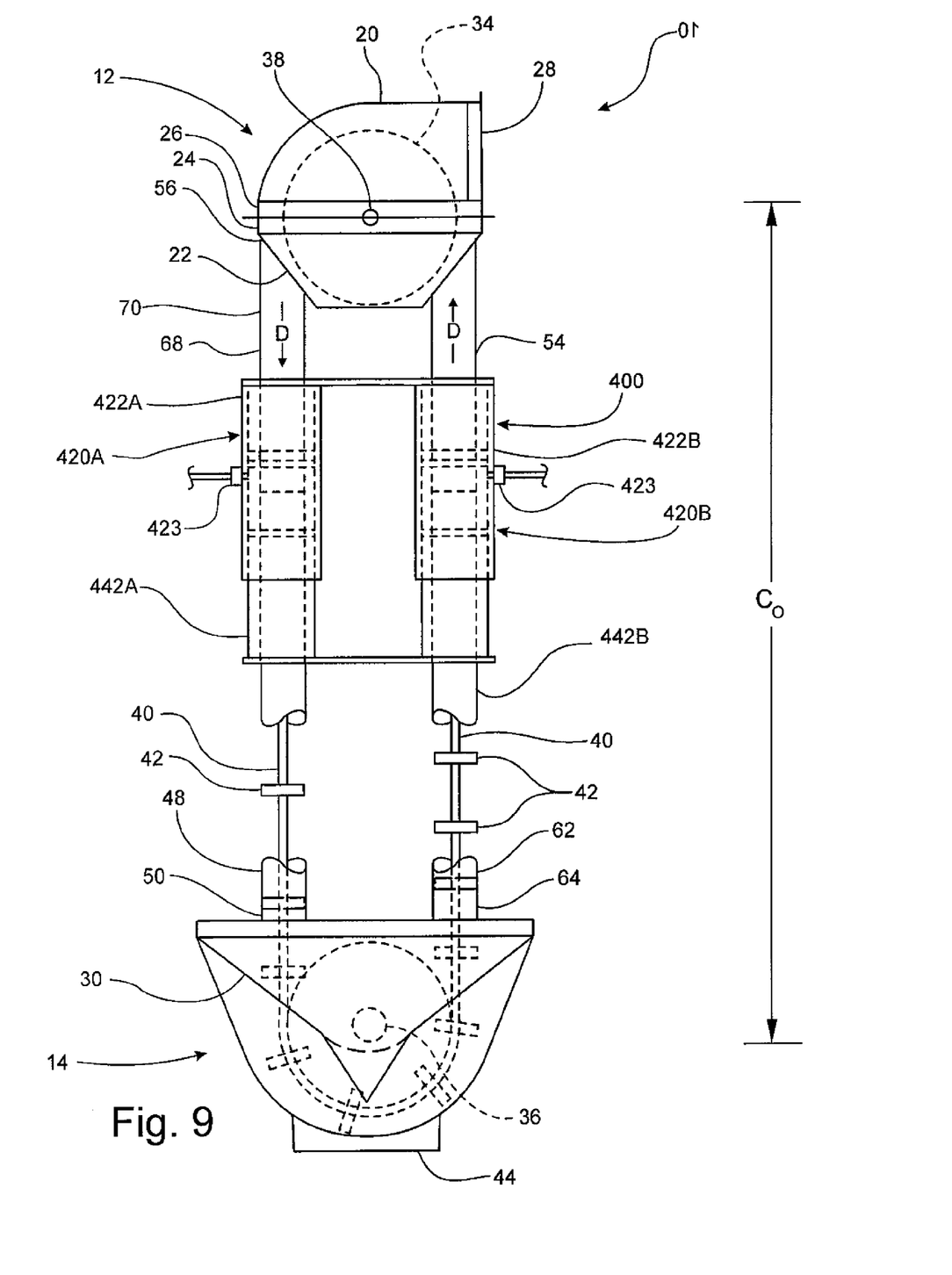
FIG. 9 shows several views of a tension control apparatus according to an embodiment of the present invention wherein a pneumatic actuator is an integral part of extending tubes for conducting particulate.

In another alternative embodiment of the present invention, a tensioning assembly 400 is shown in FIG. 9 that is similar to tensioning assembly 200 described above but does not include pneumatic actuator 262. In this embodiment, a first extendable tube 420A and second extendable tube 420B are configured to apply a tensioning force to rope assembly 40. In extendable tubes 420A, 420B, a tube extends into the bore of inner sleeve 442A, 442B from the flange 202 attached to outer sleeve 222A, 222B. An expandable cavity is defined by the tube and the inner surface of outer sleeve 422. A fluid passageway 423 formed through the outer sleeve 422 connects the expandable cavity through a pressure regulator or other device for controlling pressure to a source for compressed air. The pressure regulator is used to control the pressure of compressed air within the expandable cavity and when it is increased, extendable tube 420A lengthens. In this manner, the tension on rope assembly 40 can be maintained. Fluid passageway 423 can also be connected to a valve for venting having a first position for maintaining pressure within the expandable chamber and a second position wherein the expandable chamber is open and pressure is relieved. Tensioning device 400 can be manually retracted by pushing upper housing 12 towards flange tensioning device 400 after pressure is relieved from the expandable chamber through the valve for venting.

In the embodiments described above, the tension control apparatus of the present invention is shown in use on a vertical aero-mechanical conveyor which includes only head and tail pulley assemblies positioned within infeed and upper housings, respectively. However, the tension control apparatus of the present invention may be utilized in combination with an aero-mechanical conveyor having conveyor tubes, additional pulleys and corresponding housings interconnected in any suitable arrangement, and including any suitable entry and exit points through which the particulate matter being conveyed may enter or exit the conveyor.

What is claimed is:

1. A tensioning assembly for use in an aero-mechanical conveyor for moving bulk materials, the conveyor including upper and lower housings, head and tail pulley assemblies mounted on respective shafts positioned within the upper and lower housings, spaced-apart inflow and outflow conveyor tubes interconnecting the upper and lower housings, and an endless rope assembly disposed within the conveyor tubes and around the head and tail pulleys, the tensioning assembly comprising:

(a) a first extendable tube and a second extendable tube each configured to define a section of the inflow and outflow conveyor tubes respectively, each of the first and second extendable tubes including an inner sleeve sealingly engaging an outer sleeve having an air purge passageway formed through a sidewall thereof for connection to a source of compressed air;

(b) an adjustable actuator positioned intermediate the first and second extendable tubes that is movable between a first position and a second position and positioned in cooperative engagement with the first and second extendable tubes such that when the actuator is in the first position, the first and second extendable tubes have a first length and when the actuator is in the second position, the first and second extendable tubes have a second length, the actuator including first and second spaced-apart flanges attached to opposing ends of the first and second extendable tubes, respectively, to link corresponding first and second ends of the first and second extendable tubes in movement from the actuator;

(c) a tension measuring device configured for measuring tension within the endless rope assembly and for generating a signal indicative thereof; and (d) the actuator being configured to move between the first position and the second position in response to changes in the signal indicative of tension within the endless rope assembly; and wherein the actuator is free of mechanical attachment to the upper and lower housings.

2. A tensioning assembly according to claim 1, wherein the actuator is a pneumatic cylinder.

3. A tensioning assembly according to claim 1, wherein the actuator is a hydraulic cylinder.

4. A tensioning assembly according to claim 1, wherein the tension measuring device is a pressure regulator.

5. A tensioning assembly according to claim 1, wherein the actuator is an electro-mechanical device.

6. A tensioning assembly according to claim 1, wherein the tension measuring device is a load cell.

7. An aero-mechanical conveyor for moving bulk materials, comprising:

(a) an upper housing;
(b) a lower housing;
(c) a head pulley assembly;
(d) a tail pulley assembly;

(e) the head and tail pulley assemblies being mounted on respective shafts positioned within the upper and lower housings;

(f) an inflow conveyor tube and an outflow conveyor tube spaced-apart from the inflow conveyor tube interconnecting the upper and lower housings;

(g) an endless rope assembly disposed within the conveyor tubes and around the head and tail pulleys;

(h) a first extendable tube and a second extendable tube each configured to define a section of the inflow and outflow conveyor tubes respectively, each of the first and second extendable tubes including an inner sleeve sealingly engaging an outer sleeve having an air purge passageway formed through a sidewall thereof for connection to a source of compressed air;

(i) an adjustable actuator positioned intermediate the first and second extendable tubes that is movable between a first position and a second position and positioned in cooperative engagement with the first and second extendable tubes such that when the actuator is in the first position, the first and second extendable tubes have a first length and when the actuator is in the second position, the first and second extendable tubes have a second length, the actuator including first and second spaced-apart flanges attached to opposing ends of the first and second extendable tubes, respectively, to link corresponding first and second ends of the first and second extendable tubes in movement from the actuator;

(j) a tension measuring device configured for measuring tension within the endless rope assembly and for generating a signal indicative thereof; and (k) the actuator being configured to move between the first position and the second position in response to changes in the signal indicative of tension within the endless rope assembly; and wherein the actuator is free of mechanical attachment to the upper and lower housings.

\* \* \* \* \*